3,033,893
2-SUBSTITUTED 1-CYANOFORMIMIDIC ACID HYDRAZIDES AND THEIR PREPARATION

Lucille Theresa Morin and Ken Matsuda, Stamford, Conn., assignors to American Cyanamid Company, New York, N.Y., a corporation of Maine
No Drawing. Filed May 6, 1960, Ser. No. 27,264
15 Claims. (Cl. 260—465)

This invention relates to novel and useful nitrogen containing compounds. More particularly, the invention relates to aldehydic and ketonic derivatives of 1-cyanoformimidic acid hydrazide and to processes for their preparation.

The new class of compounds, that is, the 2-substituted 1-cyanoformimidic acid hydrazides of the present invention, may be represented by the general formula:

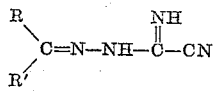

wherein R and R' are selected from the group consisting of a hydrogen atom, an aliphatic radical, such as alkyl radicals containing of from 1 to 18 carbon atoms, and an aromatic radical, such as aryl and substituted aryl, wherein the substituent on the latter aryl nucleus contemplates a radical such as: lower alkyl, halogen, hydroxyl, lower alkoxy, cyano, nitro, monoalkylamino and dialkylamino.

Illustrative compounds falling within the purview of the general formula hereinabove set forth are:

1-cyanoformimidic acid methylenehydrazide
1-cyanoformimidic acid ethylidenehydrazide
1-cyanoformimidic acid isopropylidenehydrazide
1-cyanoformimidic acid 2-octylidenehydrazide
1-cyanoformimidic acid benzylidenehydrazide
1-cyanoformimidic acid salicylidenehydrazide
1-cyanoformimidic acid naphthylidenehydrazide
1-cyanoformimidic acid α-methylbenzylidenehydrazide
1-cyanoformimidic acid (1-ethylpropylidene) hydrazide
1-cyanoformimidic acid (1-methylheptylidene) hydrazide
1-cyanoformimidic acid (2-chloro-1-methylethylidene) hydrazide
1-cyanoformimidic acid o-methoxybenzylidenehydrazide
1-cyanoformimidic acid p-methylbenzylidenehydrazide
1-cyanoformimidic acid p-anisylidenehydrazide
1-cyanoformimidic acid p-chlorobenzylidenehydrazide
1-cyanoformimidic acid p-nitrobenzylidenehydrazide
1-cyanoformimidic acid p-dimethylaminobenzylidenehydrazide
1-cyanoformimidic acid (p, α-dimethylbenzylidene) hydrazide
1-cyanoformimidic acid (α-methyl-m-nitrobenzylidene) hydrazide
1 - cyanoformimidic acid (p - methoxy - α - methylbenzylidene) hydrazide
their homologs as well as their isomeric forms.

The compounds of the present invention find utility as herbicides and nematocides.

In accordance with the practice of the present invention, the hydrazide compounds are prepared by reacting 1-cyanoformimidic acid hydrazide with a suitable aldehyde or ketone in the presence or absence of a catalyst. Where the aldehyde or ketone reactant is not a solvent as well, the reactants are preferably dissolved in a mutual inert solvent prior to reaction.

It is a good practice to dissolve the reactants in a mutual solvent or solvent mixture. However, it will be noted that in some instances the aldehyde or ketone can function as the solvent as well and no additional solvent will be required. Thus, either acetone or acetophenone, for example, dissolves 1-cyanoformimidic acid hydrazide. This solvent alone is employed in the preparation of ketonic derivatives of 1-cyanoformimidic acid hydrazide. However, typical inert solvents employed herein are: methanol, ethyl alcohol, dioxane, tetrahydrofuran and ethyl acetate. The latter may be employed, if desired, in admixture with acetone or acetophenone.

The reactant, 1-cyanoformimidic acid hydrazide, is prepared by reacting equimolar quantities of cyanogen and hydrazine. A process for its preparation is described with greater particularity below.

The carbonyl reactant includes any one of the many aliphatic and aromatic aldehydes and ketones commercially available. In general, it may be represented by the general formula:

where R and R' are radicals, each of which is a hydrogen atom, an aliphatic, or an aromatic radical, and wherein each of the R radicals may be the same or different. Illustrative carbonyl reactants include: formaldehyde, acetaldehyde, propionaldehyde, butyraldehyde, benzaldehyde, tolualdehyde, salicylaldehyde, naphthaldehyde, acetone, butanone, pentanone - 3, octanone - 2, acetophenone, p-methoxyacetophenone, their homologs and isomers.

It has been found that the molar ratio of the carbonyl reactant to 1-cyanoformimidic acid hydrazide can be widely varied. However, it appears that a satisfactory molar ratio of carbonyl compound to the hydrazide reactant is 1:1, although ratios of from 1 to 25 mols or more of the carbonyl compound per mol of hydrazide reactant are entirely satisfactory to effect reaction resulting in good yield and quality of desired product.

In general, an acidic catalyst can be incorporated into the reaction mixture to increase the rate of reaction. Usually of from about 0.1% to 2% of the acid catalyst based on the weight of the hydrazide reactant will be sufficient to effect optimum results. Illustrative catalysts include: hydrochloric, sulfuric, acetic acid and equivalents thereof.

Temperature of reaction can be widely varied. For example, temperatures in a range of 0° C. to 100° C. and preferably from about 20° C. to 80° C. are entirely suitable.

The following examples are presented for purposes of facilitating an understanding of the invention. They are not to be taken as limitative. All parts, proportions and percentages are by weight, unless otherwise specified.

EXAMPLE A

*Preparation of 1-Cyanoformimidic Acid Hydrazide*

To a suitable reaction vessel equipped with stirrer and containing 1000 parts of dioxane is added 156 parts of cyanogen at about 5° C. over a period of 2.5 hours while agitating. A solution of 96 parts of hydrazine in 330 parts of a dioxane-methanol (10 to 1) mixture is slowly added while maintaining the temperature within about 5° C. After about one-half hour, crystallization commences and the solution gradually turns orange. Agitation is continued for an additional one-half hour after all the hydrazine has been added. The product is collected by filtration as 208.3 parts of light orange solid, melting at 73°–77° C. It is recrystallized from ethylene dichloride, yielding yellow plates, melting at 83°–86° C.

Analysis.—($C_2H_4N_4$). Calculated: C, 28.57; H, 4.80; N, 66.64; M.W. 84.0. Found: C, 29.26; H, 4.94; N, 65.73; M.W. 86.5.

EXAMPLE 1

A solution comprising 4.2 parts of 1-cyanoformimidic acid hydrazide (0.05 mol) as prepared in Example A above in 50 parts of ethanol is pre-cooled to 5° C. and added to a suitable reaction vessel containing a pre-cooled (5° C.) solution of 4 parts of acetaldehyde (0.09 mol) in 50 parts of ethyl alcohol. Glacial acetic acid (0.1% based on the weight of the hydrazide reactant) is added to the resultant solution. After standing for one-half hour while maintaining the temperature of the reaction mixture at 5° C., the temperature is increased to 20° C. and held for an additional two and one-half hours at the latter temperature. A yellow oil is obtained upon removal of the ethyl alcohol solvent by vacuum distillation. The thus-obtained oil is triturated with minute quantities of hexane to yield 4.5 parts of a yellow solid. Upon recrystallization from hexane, a white solid is obtained which has a melting point of 62°–64° C. The product, 1-cyanoformimidic acid ethylidene-hydrazide, gives the following analysis:

Calculated for ($C_4H_6N_4$): C, 43.63; H, 5.49; N, 50.88; M.W. 110.1. Found: C, 43.33; H, 5.41; N, 50.81; M.W. 107.2.

EXAMPLE 2

4.2 parts of 1-cyanoformimidic acid hydrazide (0.05 mol) prepared in Example A and about 0.1% glacial acetic acid based on the weight of the latter hydrazide are added to a solution of 5.3 parts of benzaldehyde (0.05 mol) in 75 parts (by volume) of ethyl alcohol in a suitable reaction vessel. The resultant mixture is heated for one-half hour on a steam bath at about 78° C. Evaporation of the alcohol solvent yields 7.0 parts of 1-cyanoformimidic acid benzylidenehydrazide. The latter product is recrystallized from carbon tetrachloride as a yellow solid having a melting point of 127° C. to 128° C. and analyzes as follows:

Calculated for ($C_9H_8N_4$): C, 62.77; H, 4.68; N, 32.54; M.W. 172.2. Found: C, 62.63; H, 4.95; N, 32.30; M.W. 170.0.

EXAMPLE 3

To a suitable reaction vessel containing an alcoholic solution of 7.2 parts of salicylaldehyde (0.06 mol) in 75 parts (by volume) of absolute alcohol and containing 1.5% glacial acetic acid based on the weight of the hydrazide reactant are slowly added 5 parts of 1-cyanoformimidic acid hydrazide (0.06 mol) with active agitation. The solution is heated for one hour at about 78° C. Upon cooling, 10.5 parts of a yellow solid are obtained. The product, 1-cyanoformimidic acid salicylidenehydrazide, which has a melting point of 179° C. (dec.) analyzes as follows:

Calculated for ($C_9H_8N_4O$): C, 57.43; H, 4.28; N, 29.77; O, 8.50; M.W. 188.2. Found: C, 57.72; H, 4.26; N, 29.36; O, 9.39; M.W. 188.7.

EXAMPLE 4

To a suitable reaction vessel containing a mixture of about 1000 parts of acetone (5.8 mols) and about 0.1% of acetic acid as a catalyst are added and dissolved about 20 parts of 1-cyanoformimidic acid hydrazide (0.24 mol). The mixture is heated for one-half hour at about 56° C. On evaporation of unreacted acetone solvent, 21 parts of desired product in solid form is obtained. That product, 1-cyanoformimidic acid isopropylidenehydrazide is found to have a melting point of about 115° C. to 116° C. and analyzes as follows:

Calculated for ($C_5H_8N_4$): C, 48.38; H, 6.45; N, 45.16; M.W. 124. Found: C, 48.31; H, 6.53; N, 45.23; M.W. 123.

EXAMPLE 5

4.2 parts of 1-cyanoformimidic acid hydrazide (0.05 mol) and 2% of glacial acetic acid are added to a suitable reaction vessel containing an alcoholic solution of 6.6 parts of acetophenone (0.05 mol) in 75 parts (by volume) of ethyl alcohol. The mixture is heated for 4 hours on a steam bath maintained at a temperature of about 75° C. Evaporation of the alcoholic solvent yields a yellow solid of melting point 75°–85° C. The product, 1-cyanoformimidic acid α-methylbenzylidenehydrazide, is washed with water and recrystallized from hexane to yield a yellow solid having a melting point of 99°–101.5° C. and has the following analysis:

Calculated for ($C_{10}H_{10}N_4$): C, 64.50; H, 5.41; N, 30.09. Found: C, 63.90; H, 5.45; N, 31.03.

EXAMPLE 6

A solution of 21 parts of 1-cyanoformimidic acid hydrazide (0.25 mol) in 250 parts of ethyl alcohol and 32 parts of 2-octanone (0.25 mol) are admixed in a suitable reaction vessel and acetic acid is added thereto until the solution is slightly acidic (pH=6.5). The latter solution is heated for one and one-half hours at 79° C. Alcohol solvent is stripped under vacuum, leaving 48 parts of an orange liquid having a boiling point of 124° C. to 127° C. at 1 mm. Hg. The product formed is 1-cyanoformimidic acid 2-octylidenehydrazide having the following analysis:

Calculated for ($C_{10}H_{18}N_4$): C, 61.81; H, 9.34; N, 28.84. Found: C, 61.40; H, 9.28; N, 29.13.

EXAMPLE 7

An alcoholic solution of 4.2 parts of 1-cyanoformimidic acid hydrazide (0.05 mol) and 6.0 parts of p-tolualdehyde (0.05 mol) in 150 parts of ethyl alcohol is heated on a steam bath at 78° C. for two hours. Evaporation of the solvent yields solid 1-cyanoformimidic acid p-methylbenzylidenehydrazide analyzing as:

Calculated for ($C_{10}H_{10}N_4$): C, 64.50; H, 5.41; N, 30.09. Found: C, 64.33; H, 5.60; N, 30.27.

EXAMPLE 8

4.2 parts of 1-cyanoformimidic acid hydrazide (0.05 mol) and 0.1% glacial acetic acid are added to a solution of 7.5 parts of p-methoxyacetophenone (0.05 mol) in 200 parts of ethyl alcohol. The resultant solution is refluxed at 78° C. for four hours on a steam bath. Evaporation of the solvent yields a solid, 1-cyanoformimidic acid p-anisylidenehydrazide analyzing as:

Calculated for ($C_{11}H_{12}N_4O$): C, 61.09; H, 5.59; N, 25.91; O, 7.40. Found: C, 61.37; H. 5.71; N, 25.54; O, 7.09.

The compounds of the present invention are useful as nematocides. To demonstrate such utility, the following examples are presented.

EXAMPLE 9

A suspension containing both 100 vinegar eelworms, *Anguilla sp.*, and 0.1% of 1-cyanoformimidic acid isopropylidenehydrazide is prepared and added to a suitable container which is placed on a tumbler. The container and contents are rotated for twenty hours. A 95% kill of said eelworms is observed.

EXAMPLE 10

Repeating Example 9 in every material respect except that 1-cyanoformimidic acid benzylidenehydrazide is substituted for the isopropylidenehydrazide of the latter example. It is observed that a 90% kill of the eelworm is obtained.

EXAMPLE 11

To demonstrate the effectiveness of the compounds of the invention as herbicides, the following is presented.

Approximately 50 radish seeds and 50 wheat seeds are each placed in separate 1-ounce bottles together with 25 cc. of a 0.1% water suspension of 1-cyanoformimidic acid α-methylbenzylidenehydrazide. The bottles containing test compound and seeds are clamped in place on a tumbler where each is rotated for twenty hours. The seeds are then removed from the bottles, washed with approximately 225 cc. of water to remove excess hydrazide test compound and, thereafter, placed on moist blotters. The seeds so-treated are placed in a high humidity cabinet for a five-day germination period. 95% seed mortality is observed.

We claim:
1. The class of compounds having the general formula:

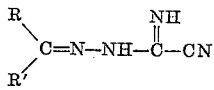

wherein R and R' are each a substituent selected from the group consisting of hydrogen, an alkyl of from 1 to 18 carbon atoms, phenyl, naphthyl, tolyl, hydroxyphenyl and methoxyphenyl.

2. The compound: 1-cyanoformimidic acid ethylidenehydrazide.
3. The compound: 1-cyanoformimidic acid isopropylidenehydrazide.
4. The compound: 1-cyanoformimidic acid benzylidenehydrazide.
5. The compound: 1-cyanoformimidic acid salicylidenehydrazide.
6. The compound: 1-cyanoformimidic acid α-methylbenzylidenehydrazide.
7. A method of preparing 2-substituted 1-cyanoformimidic acid hydrazide which comprises: admixing 1-cyanoformimidic acid hydrazide with a carbonyl compound having the general formula:

wherein R and R' are each a substituent selected from the group consisting of hydrogen, an alkyl of from 1 to 18 carbon atoms, phenyl, napthyl, tolyl, hydroxyphenyl and methoxyphenyl at a temperature of from about 0° C. to 100° C., and thereafter recovering the resultant 2-substituted 1-cyanoformimidic acid hydrazide.

8. The process according to claim 7 wherein the reaction is carried out in the presence of an acidic catalyst selected from the group consisting of hydrochloric acid, sulfuric acid and acetic acid.
9. The process according to claim 7 wherein the reaction is carried out in the presence of an inert organic solvent.
10. The process according to claim 7 wherein the said carbonyl and hydrazide compounds are reacted in substantially equimolar proportions.
11. The process according to claim 7 wherein the carbonyl compound is acetaldehyde.
12. The process according to claim 7 wherein the carbonyl compound is benzaldehyde.
13. The process according to claim 7 wherein the carbonyl compound is salicylaldehyde.
14. The process according to claim 7 wherein the carbonyl compound is acetone.
15. The process according to claim 7 wherein the carbonyl compound is acetophenone.

References Cited in the file of this patent

UNITED STATES PATENTS

| | | |
|---|---|---|
| 2,455,894 | Lecher et al. | Dec. 7, 1948 |
| 2,710,851 | Boyd | June 14, 1955 |
| 2,792,296 | Heininger | May 14, 1957 |
| 2,802,021 | Heininger | Aug. 6, 1957 |

FOREIGN PATENTS

| | | |
|---|---|---|
| 513,436 | Italy | Feb. 4, 1955 |